United States Patent
Kurisu

(10) Patent No.: US 11,203,691 B2
(45) Date of Patent: Dec. 21, 2021

(54) CARBON BLACK, METHOD FOR PRODUCING CARBON BLACK, AND RUBBER COMPOSITION

(71) Applicant: TOKAI CARBON CO., LTD., Tokyo (JP)

(72) Inventor: Kengo Kurisu, Tokyo (JP)

(73) Assignee: TOKAI CARBON CO., LTD., Tokyo (JP)

( * ) Notice: Subject to any disclaimer, the term of this patent is extended or adjusted under 35 U.S.C. 154(b) by 695 days.

(21) Appl. No.: 15/999,830

(22) PCT Filed: Apr. 7, 2016

(86) PCT No.: PCT/JP2016/061364
§ 371 (c)(1),
(2) Date: Aug. 17, 2018

(87) PCT Pub. No.: WO2017/141452
PCT Pub. Date: Aug. 24, 2017

(65) Prior Publication Data
US 2021/0017393 A1    Jan. 21, 2021

(30) Foreign Application Priority Data
Feb. 19, 2016  (JP) .............................. JP2016-029547

(51) Int. Cl.
*C09C 1/48* (2006.01)
*C08L 21/00* (2006.01)

(52) U.S. Cl.
CPC ............... *C09C 1/48* (2013.01); *C08L 21/00* (2013.01)

(58) Field of Classification Search
CPC .................................. C09C 1/48; C08L 21/00
See application file for complete search history.

(56) References Cited

U.S. PATENT DOCUMENTS

| 4,398,582 A | * | 8/1983 | Yuto | ......................... C08L 9/06 |
| | | | | 152/209.5 |
| 7,485,280 B2 | * | 2/2009 | Matsuki | ................. B82Y 30/00 |
| | | | | 423/449.1 |

FOREIGN PATENT DOCUMENTS

| JP | 1-207359 A | | 8/1989 |
|---|---|---|---|
| JP | 10-130424 A | | 5/1998 |
| JP | 10-251455 A | | 9/1998 |
| JP | 11-60800 A | | 3/1999 |
| JP | 11060800 A | * | 3/1999 |
| JP | 11-279337 A | | 10/1999 |
| JP | 2003-335980 A | | 11/2003 |
| JP | 2003335980 A | * | 11/2003 |

OTHER PUBLICATIONS

International Search Report dated Jul. 5, 2016, issued in counterpart application No. PCT/JP2016/061364, w/English translation. (5 pages).
Written Opinion Report dated Jul. 5, 2016, issued in counterpart application No. PCT/JP2016/061364. (5 pages).

* cited by examiner

*Primary Examiner* — Yong L Chu
(74) *Attorney, Agent, or Firm* — Westerman, Hattori, Daniels & Adrian, LLP

(57) ABSTRACT

It is intended to provide a carbon black which can confer reinforcing properties and low exothermicity, which are usually incompatible, as well as excellent abrasion resistance, when mixed with a rubber component, and is suitable for tire tread rubber that is used particularly under severe driving conditions.
The present invention provides a carbon black having surface free energy $\gamma^d$ of 50 to 200 mJ/m² determined by a reverse-phase gas chromatography analysis method and a strongly acidic group concentration of 0 to 0.115 μmol/m².

5 Claims, 2 Drawing Sheets

[Figure 1]
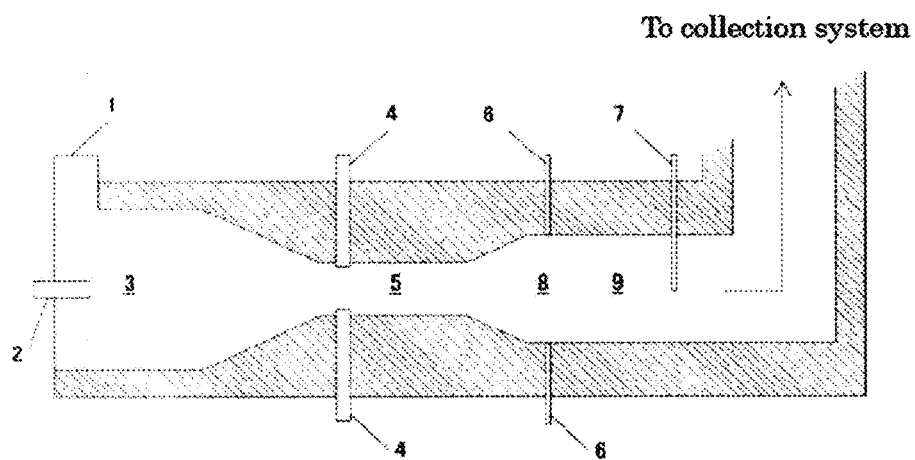
[Figure 2]
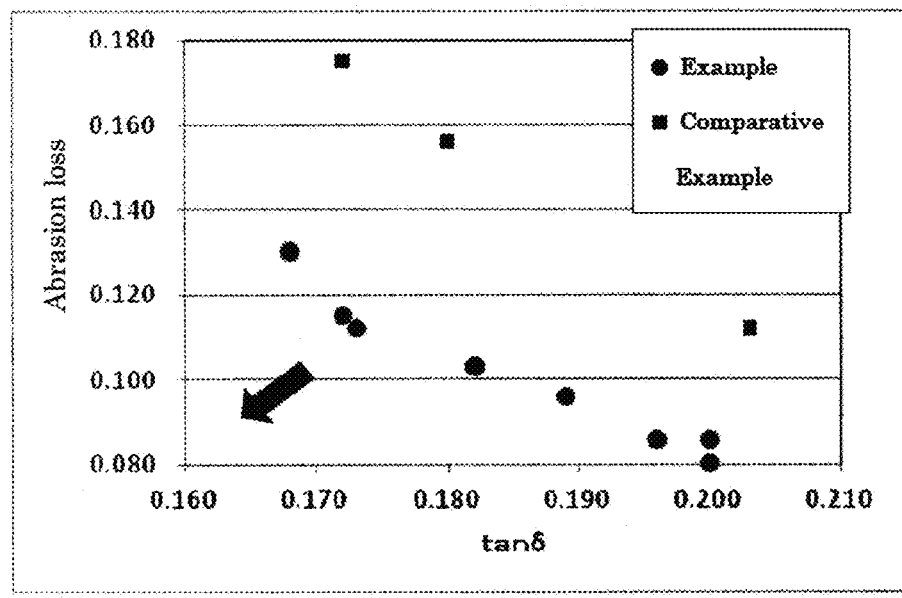

[Figure 3]
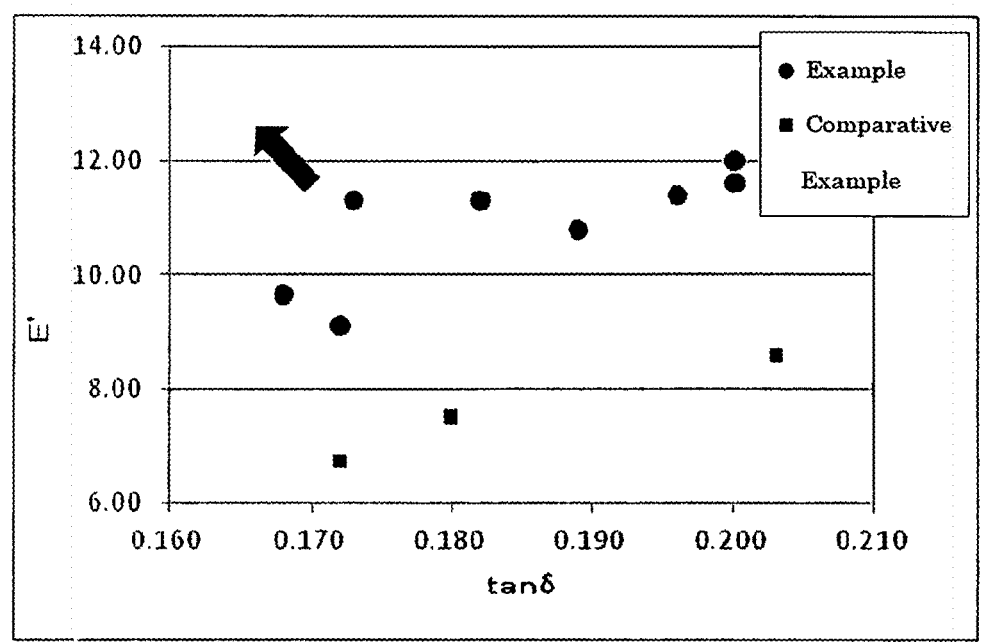

CARBON BLACK, METHOD FOR PRODUCING CARBON BLACK, AND RUBBER COMPOSITION

TECHNICAL FIELD

The present invention relates to a carbon black, a method for producing a carbon black, and a rubber composition.

BACKGROUND ART

Carbon blacks for rubber reinforcement have diverse varieties according to possessed characteristics. These possessed characteristics are major determinants for the performance of rubbers. Therefore, carbon blacks having characteristics appropriate to purposes of members are selected when contained in rubber compositions.

For example, highly structured hard carbon blacks having a small primary particle size and a large specific surface area, such as SAF (N110) and ISAF (N220), have heretofore been used for rubber members that require a high level of reinforcing properties, such as tire treads (see Patent Literature 1 (Japanese Patent Laid-Open No. 10-130424), etc.).

CITATION LIST

Patent Literature

[Patent Literature 1] Japanese Patent Laid-Open No. 10-130424

SUMMARY OF INVENTION

Technical Problem

Rubbers obtained from rubber compositions containing the carbon blacks described above, when used in tire treads, confer a high level of reinforcing properties; however, such rubbers are more likely to increase exothermic characteristics and are less likely to attain improvement in fuel efficiency. In addition, since the carbon blacks described above have a small particle size and a large specific surface area, the carbon blacks, when contained in rubbers, increase the viscosity and hardness of rubber components in the course of kneading and are thus difficult to homogeneously disperse in the rubber components. This facilitates reduction in the quality characteristics, particularly, abrasion resistance important for tire treads, of the rubber compositions.

A possible method involves improving abrasion resistance by increasing the contents of the carbon blacks. However, this method not only elevates the modulus of elasticity of rubber compositions to impair workability but also is more likely to incur reduction in cut resistance or chipping resistance during tire driving.

Under these circumstances, an object of the present invention is to provide a carbon black which can confer reinforcing properties and low exothermicity as well as excellent abrasion resistance, when mixed with a rubber component, and is suitable for tire tread rubber that is used particularly under severe driving conditions, and to provide a method for producing a carbon black, and a rubber composition.

Solution to Problem

In order to solve the technical problems described above, the present inventor has conducted diligent studies and consequently found that the technical problems can be solved by a carbon black having surface free energy $\gamma^d$ of 50 to 200 mJ/m$^2$ determined by a reverse-phase gas chromatography analysis method and a strongly acidic group concentration of 0 to 0.115 μmol/m$^2$. On the basis of these findings, the present invention has been completed.

Specifically, the present invention provides:

(1) a carbon black having surface free energy $\gamma^d$ of 50 to 200 mJ/m$^2$ determined by a reverse-phase gas chromatography analysis method and a strongly acidic group concentration of 0 to 0.115 μmol/m$^2$;

(2) the carbon black according to (1), wherein the carbon black has a nitrogen adsorption specific surface area of 80 to 200 m$^2$/g and a 24M4DBP absorption of 50 to 130 cm$^3$/100 g;

(3) a method for producing a carbon black according to (1), in which a reactor provided with a fuel combustion zone, a raw material introduction zone and a surfactant introduction zone in the presented order from the upstream toward downstream directions of a gas channel is used, the method comprising introducing an oxygen-containing gas and a fuel to the fuel combustion zone for co-combustion to generate a high-temperature combustion gas flow, introducing the high-temperature combustion gas flow to the raw material introduction zone while introducing a raw material hydrocarbon thereto, and subsequently introducing a surfactant to the surfactant introduction zone, to thereby allow reaction to proceed to produce a carbon black-containing gas; and (4) a rubber composition comprising 20 to 150 parts by mass of a carbon black according to (1) or (2) with respect to 100 parts by mass of a rubber component.

Advantageous Effects of Invention

The present invention can provide a carbon black which can confer reinforcing properties and low exothermicity as well as excellent abrasion resistance, when mixed with a rubber component, and is suitable for tire tread rubber that is used particularly under severe driving conditions. The present invention can also provide a method for conveniently producing the carbon black, and a rubber composition.

BRIEF DESCRIPTION OF DRAWINGS

FIG. 1 is a schematic cross-sectional view showing an exemplary form of a reactor for use in the production of the carbon black according to the present invention.

FIG. 2 is a diagram showing the relationship of an abrasion loss with a loss coefficient (tan δ) for carbon blacks obtained in Examples and Comparative Examples of the present invention.

FIG. 3 is a diagram showing the relationship of dynamic storage modulus E' with the loss coefficient (tan δ) for carbon blacks obtained in Examples and Comparative Examples of the present invention.

DESCRIPTION OF EMBODIMENTS

First, the carbon black according to the present invention will be described.

The carbon black according to the present invention has surface free energy $\gamma^d$ of 50 to 200 mJ/m$^2$ determined by a reverse-phase gas chromatography analysis method and a strongly acidic group concentration of 0 to 0.115 μmol/m$^2$.

In the carbon black according to the present invention, the surface free energy $\gamma^d$ determined by a reverse-phase gas chromatography analysis method is 50 to 200 mJ/m², more preferably 55 to 195 mJ/m², further preferably 55 to 190 mJ/m².

When the surface free energy $\gamma^d$ determined by a reverse-phase gas chromatography analysis method falls within the range described above, the carbon black according to the present invention can impart reinforcing properties and low exothermicity to a rubber composition and can also easily improve abrasion resistance because the carbon black particles have a smaller cohesive force therebetween and can thus be easily dispersed in a rubber component during kneading.

If the surface free energy $\gamma^d$ determined by a reverse-phase gas chromatography analysis method is less than 50 mJ/m², the resulting rubber composition is less likely to exert the desired abrasion resistance while reinforcing properties are more likely to be decreased due to the decreased interaction of the carbon black with a rubber component. If the surface free energy $\gamma^d$ determined by a reverse-phase gas chromatography analysis method is more than 200 mJ/m², the resulting rubber composition has a larger loss coefficient (tan δ) value while impact resistance or exothermic characteristics are more likely to be decreased According to the studies of the present inventor, the surface free energy $\gamma^d$ of the carbon black determined by a reverse-phase gas chromatography analysis method serves as a parameter that indicates the activation level of surface texture of the carbon black particles, i.e., the rate of chemical reactivity with rubber molecules and the degree of strength of the chemical reactivity. The magnitude of the surface free energy $\gamma^d$ is also related to the particle size or specific surface area of the carbon black particles. For example, a larger value of the specific surface area also leads to a larger value of the surface free energy $\gamma^d$.

The present inventor has further found that when the surface free energy $\gamma^d$ determined by a reverse-phase gas chromatography analysis method falls within the range of 50 to 200 mJ/m², which is relatively low as compared with usual carbon blacks, the carbon black improves the abrasion resistance of a rubber composition.

This is probably because in the cases of having the same specific surface area (nitrogen adsorption specific surface area), a carbon black having a fewer active sites rich in chemical reactivity has a smaller cohesive force between its particles and are thus easily dispersed in a rubber during kneading to thereby improve abrasion resistance.

When the surface free energy $\gamma^d$ determined by a reverse-phase gas chromatography analysis method falls within the range described above, the carbon black is capable of exerting given interaction with a rubber component and exerting predetermined reinforcing properties in a rubber composition and also suppresses a rise in the loss coefficient (tan δ) of the rubber composition. This probably facilitates high impact resistance or low exothermic characteristics.

In the present specification, the surface free energy $\gamma^d$ determined by a reverse-phase gas chromatography analysis method means a value measured by the following method.

(Method for Measuring Surface Free Energy $\gamma^d$)

The surface free energy $\gamma^d$ of the carbon black is measured by packing a stainless steel (SUS) tube having an outside diameter of 4 mm, an inside diameter of 3 mm, and a length of 80 mm with the carbon black to prepare a column for measurement, and setting the total surface area of the carbon black as a measurement sample to 10 m², followed by the reverse-phase gas chromatography analysis method under the following conditions.

Measurement apparatus: GC-8A manufactured by Shimadzu Corp.
Detector: FID (flame ionization detector)
Injection temperature: 200° C.
Intracolumn temperature: 100° C.
Detector temperature: 200° C.
Carrier gas: nitrogen gas (adjusted such that a flow rate measured in a bubble film flow meter is 30 mL/min)
Probe: C5 (n-pentane) and C6 (n-hexane)

Under the conditions described above, each retention time is measured when each probe is injected at 0.5 μL, 0.4 μL, 0.3 μL, 0.2 μL, 0.1 μL, 0.05 μL, 0.02 μL, and 0.01 μL using a microsyringe. The measured retention time is multiplied by a carrier gas flow rate to calculate the retention volume of the sample. An infinite dilution retention volume ($V_N$) of each probe is estimated according to a quartic. An increment of free energy ascribable to increase in the number of carbon atoms by one in the probe molecule, i.e., an amount of change in adsorption energy per mol of a methyl group ($CH_2$ group) ($\Delta G_{(CH2)}$) is represented by the expression (1) given below. However, in the expression (1) given below, $V_{N(n+1)}$ is the infinite dilution retention volume of a linear alkane having the number of carbon atoms larger by one than that of $V_{N(n)}$.

[Expression 1]

$$\Delta G_{(CH2)} = RT \ln \frac{V_{N(n+1)}}{V_{N(n)}} \qquad (1)$$

When a geometric mean formula proposed by Fowkes is used, the amount of change in adsorption energy per mol of a methyl group ($CH_2$ group) ($\Delta G_{(CH2)}$) is represented by the expression (2) given below. However, in the expression (2) given below, $N_A$ is an Avogadro's number ($6.022 \times 10^{23}$ mol$^{-1}$), $a_{(CH2)}$ is a contact area per $CH_2$ group ($0.06 \times 10^{-18}$ m, $\gamma^d_{(CH2)}$ is a dispersion force component of the surface free energy of a $CH_2$ group, and $\gamma^d_X$ is a dispersion force component of the surface free energy of an adsorption layer.

[Expression 2]

$$\Delta G_{(CH2)} = N_A \times a_{(CH2)} 2\sqrt{\gamma^d_{(CH2)}}\sqrt{\gamma^d_X} \qquad (2)$$

In this context, polyethylene (PE) consisting of $CH_2$ groups is used. When a dispersion force component of the surface free energy of the $CH_2$ groups constituting the polyethylene is defined as $\gamma^d_{PE}$, the following expression (3) is derived from $\gamma^d_{(CH2)} = \gamma^d_X = \gamma^d_{PE}$.

[Expression 3]

$$\gamma^d_x = \gamma^d_{PE} \left\{ \frac{\left(\ln \frac{V_{N(n+1)}}{V_{N(n)}}\right)_x}{\left(\ln \frac{V_{N(n+1)}}{V_{N(n)}}\right)_{PE}} \right\}^2 \qquad (3)$$

The surface free energy of interest is calculated by substituting $\gamma^d_{PE}$ (reference value) and the infinite dilution retention volumes of the PE and the carbon black sample into the expression.

The carbon black according to the present invention has a strongly acidic group concentration of 0 to 0.115 μmol/m², preferably 0 to 0.113 μmol/m², more preferably 0 to 0.112 μmol/m².

When the strongly acidic group concentration of the carbon black according to the present invention falls within the range described above, the carbon black interacts more strongly with a rubber component and can further improve the abrasion resistance of a rubber composition.

The strongly acidic group concentration of the carbon black serves as a parameter that indicates the amount of a functional group on carbon black particle surface, i.e., chemical reactivity with rubber molecules. According to the studies of the present inventor, the magnitude of the strongly acidic group concentration is also related to the particle size or specific surface area of the carbon black particles. For example, a larger specific surface area has been found to also lead to a larger strongly acidic group concentration.

The carbon black having a strongly acidic group concentration within a given range has a relatively low level of the strongly acidic group concentration to the specific surface area (nitrogen adsorption specific surface area) as compared with usual carbon blacks. For this reason, in the cases of having the same specific surface area described above, a carbon black having a fewer surface functional groups, which inhibit the interaction between the carbon black and a rubber, interacts more strongly with the rubber. This probably improves abrasion resistance.

In the present specification, the strongly acidic group concentration means the total amount of acidic functional groups ($\mu mol/m^2$) per unit specific surface area determined by precisely weighing 5 g of a carbon black sample, crushing the sample, adding 50 mL of a 0.1 (mol/L) sodium bicarbonate solution to the powder, shaking the mixture at room temperature for 4 hours, then titrating 20 mL of the supernatant with 0.025 (mol/L) sulfuric acid while concurrently conducting a blank test, and determining the strongly acidic group concentration from the difference therebetween and the nitrogen adsorption specific surface area ($N_2SA$).

The carbon black according to the present invention has a nitrogen adsorption specific surface area ($N_2SA$) of preferably 80 to 200 $m^2/g$, more preferably 90 to 190 $m^2/g$, further preferably 95 to 185 $m^2/g$.

When the nitrogen adsorption specific surface area of the carbon black according to the present invention falls within the range described above, the carbon black, when used as a component contained in a rubber composition, can more suitably suppress increase in exothermicity and can further easily improve abrasion resistance, in the resulting rubber composition.

If the nitrogen adsorption specific surface area is less than 80 $m^2/g$, abrasion resistance is less likely to be improved. If the nitrogen adsorption specific surface area is more than 200 $m^2/g$, exothermicity is more likely to be increased.

In the present specification, the nitrogen adsorption specific surface area means a value measured from a nitrogen adsorption in conformity to a method defined in JIS K6217-2 2001 "Testing methods of fundamental characteristics of carbon black for rubber industry".

The carbon black according to the present invention has a 24M4DBP (dibutylphthalate) absorption of preferably 50 to 130 $cm^3/100$ g, more preferably 60 to 125 $cm^3/100$ g, further preferably 65 to 120 $cm^3/100$ g.

When the 24M4DBP absorption of the carbon black according to the present invention falls within the range described above, the carbon black, when used as a component contained in a rubber composition, can also more suitably suppress increase in exothermicity and can further easily improve workability and abrasion resistance, in the resulting rubber composition.

If the 24M4DBP absorption is less than 50 $cm^3/100$ g, abrasion resistance is less likely to be improved. If the 24M4DBP absorption is more than 130 $cm^3/100$ g, workability is more likely to be decreased.

In the present specification, the 24M4DBP absorption means a DBP absorption measured as to a compressed sample in conformity to a method defined in JIS K6214-4.

Next, the method for producing a carbon black according to the present invention will be described.

The method for producing a carbon black according to the present invention is a method for producing the carbon black of the present invention mentioned above. In the method, a reactor provided with a fuel combustion zone, a raw material introduction zone and a surfactant introduction zone in the presented order from the upstream toward downstream directions of a gas channel is used, and the method includes introducing an oxygen-containing gas and a fuel to the fuel combustion zone for co-combustion to generate a high-temperature combustion gas flow, introducing the high-temperature combustion gas flow to the raw material introduction zone while introducing a raw material hydrocarbon thereto, and subsequently introducing a surfactant to the surfactant introduction zone, to thereby allow reaction to proceed to produce a carbon black-containing gas.

The method for producing a carbon black according to the present invention employs a reactor provided with a fuel combustion zone, a raw material introduction zone and a surfactant introduction zone in the presented order from the upstream toward downstream directions of a gas channel. Examples of such a reactor can include a large-diameter cylindrical reactor schematically shown in FIG. 1.

Hereinafter, the method for producing a carbon black according to the present invention will be described by appropriately referring to the reactor shown in FIG. 1.

The reactor shown in FIG. 1 is provided with fuel combustion zone 3, raw material introduction zone 5, surfactant introduction zone 8 and reaction zone 9 in the presented order which communicate with each other from the upstream toward downstream directions of a gas channel formed in the reactor.

Specifically, in the reactor shown in FIG. 1, the fuel combustion zone 3 has oxygen-containing gas inlet 1 which introduces an oxygen-containing gas such as air from a direction perpendicular to the axial direction of the reactor, and burner 2 for combustion which supplies a fuel in the axial direction of the reactor. The raw material introduction zone 5 has raw material introduction nozzle 4 which supplies a raw material hydrocarbon from a direction perpendicular to the axial direction of the reactor, and is disposed to coaxially communicate with the fuel combustion zone 3. The surfactant introduction zone 8 has surfactant introduction nozzle 6 which supplies a surfactant from a direction perpendicular to the axial direction of the reactor, and is disposed to coaxially communicate with the raw material introduction zone 5. The reaction zone 9 is disposed to coaxially communicate with the surfactant introduction zone 8. In the reactor shown in FIG. 1, a reaction termination zone is also disposed to coaxially communicate with the reaction zone 9. The reaction termination zone is provided with coolant introduction nozzle 7 which sprays a coolant from a direction perpendicular to the axial direction of the reactor.

The reactor shown in FIG. 1 has a Tsuzumi (Japanese hand drum)-like shape that reduces its diameter from the fuel combustion zone 3 toward the raw material introduction zone 5 and also expands its diameter from the raw material introduction zone 5 toward the surfactant introduction zone 8. The reactor shape is not limited to such a shape and can adopt various shapes.

In the method for producing a carbon black according to the present invention, an oxygen-containing gas and a fuel are introduced to the fuel combustion zone 3 for co-combustion to generate a high-temperature combustion gas flow.

Examples of the oxygen-containing gas can include gases consisting of oxygen, air or a mixture thereof. Examples of the fuel can include hydrogen, carbon monoxide, natural gas, petroleum gas, FCC residue oil, petroleum-derived liquid fuels such as heavy fuel oil, and coal-derived liquid fuels such as creosote oil.

The amount of the oxygen-containing gas supplied to the fuel combustion zone 3 is preferably 2000 Nm$^3$/h to 5000 Nm$^3$/h, more preferably 2500 Nm$^3$/h to 4500 Nm$^3$/h, further preferably 3000 Nm$^3$/h to 4000 Nm$^3$/h. Also, the amount of the fuel supplied to the fuel combustion zone 3 is preferably 50 kg/h to 400 kg/h, more preferably 100 kg/h to 300 kg/h, further preferably 150 kg/h to 200 kg/h.

In the fuel combustion zone 3, for example, the oxygen-containing gas preheated to 400° C. to 500° C. is supplied while the fuel can be supplied for the co-combustion of the oxygen-containing gas and the fuel to generate a high-temperature combustion gas flow.

In the method for producing a carbon black according to the present invention, the high-temperature combustion gas flow is introduced to the raw material introduction zone 5 while a raw material hydrocarbon is introduced to the raw material introduction zone 5 from the raw material oil introduction nozzle 4.

Examples of the raw material oil (raw material hydrocarbon) to be supplied to the raw material introduction zone 5 can include: aromatic hydrocarbons such as benzene, toluene, xylene, naphthalene, and anthracene; coal-derived hydrocarbons such as creosote oil and carboxylic acid oil; petroleum-derived heavy crude oils such as ethylene heavy end oil and FCC residue oil; acetylenic unsaturated hydrocarbons; ethylenic hydrocarbons; and aliphatic saturated hydrocarbons such as pentane and hexane.

Examples of the raw material oil introduction nozzle can include single-fluid nozzles.

The amount of the raw material hydrocarbon introduced is not particularly limited and is preferably 300 kg/h to 2000 kg/h, more preferably 500 kg/h to 1500 kg/h, further preferably 750 kg/h to 1250 kg/h.

In the method for producing a surfactant according to the present invention, a surfactant is introduced to the surfactant introduction zone 8 after the introduction of the raw material hydrocarbon to the raw material introduction zone 5.

The surfactant is preferably a nonionic surfactant, more preferably one or more surfactants selected from a nonionic ether-type surfactant, a nonionic ester-type surfactant, and a nonionic amine-type surfactant, further preferably a nonionic ether-type surfactant.

Examples of these surfactants can include one or more surfactants selected from polyoxyethylene alkyl ether, polyoxyethylene alkyl phenyl ether, polyoxyethylene styryl phenyl ether, polyoxyethylene alkyl aryl ether, polyoxyethylene alkyl ester, and polyoxyethylene alkylamine.

The amount of the surfactant introduced to the surfactant introduction zone is preferably 30 to 300 L/h, more preferably 50 to 250 L/h, further preferably 100 to 200 L/h.

If the amount of the surfactant introduced is less than 30 L/h, it is difficult to obtain a carbon black with sufficiently reduced surface free energy $\gamma^d$ and strongly acidic group concentration. If the amount of the surfactant introduced is more than 300/h, this facilitates rapid decrease in temperature in the reactor and reduction in the runnability of the reactor.

In the method for producing a carbon black according to the present invention, the amount of the surfactant supplied to the surfactant introduction zone relative to a given weight of the raw material hydrocarbon supplied to the raw material introduction zone (the amount of the surfactant introduced/the amount of the raw material hydrocarbon introduced) is preferably 0.01 (L/h)/1 (kg/h) to 0.6 (L/h)/1 (kg/h), more preferably 0.05 (L/h)/1 (kg/h) to 0.4 (L/h)/1 (kg/h), further preferably 0.1 (L/h)/1 (kg/h) to 0.3 (L/h)/1 (kg/h).

As mentioned above, in the method for producing a carbon black according to the present invention, the raw material hydrocarbon is introduced to the raw material introduction zone, and then, the surfactant is introduced to the surfactant introduction zone so that the contact of the raw material hydrocarbon with oxygen is suppressed. For this reason, a carbon black with sufficiently reduced surface free energy $\gamma^d$ and strongly acidic group concentration within the desired ranges can probably be obtained.

In the case of using the reactor shown in FIG. 1 in the method for producing a carbon black according to the present invention, the reaction of the raw material hydrocarbon proceeds to some degree in the raw material introduction zone 5 or the surfactant introduction zone 8. However, the produced carbon black-containing gas can be introduced to the reaction zone 9 and further sufficiently reacted. In the method for producing a carbon black according to the present invention, a reactor lacking the reaction zone 9 may be used.

In the reactor shown in FIG. 1, the carbon black-containing gas is introduced to the reaction termination zone where a coolant is sprayed thereto.

Examples of the coolant can include water. The coolant thus sprayed cools carbon black particles floated and suspended in the high-temperature combustion gas. The spraying of the coolant can be performed, for example, by spraying the coolant from the coolant introduction nozzle 7 shown in FIG. 1.

Subsequently, the cooled carbon black particles pass through a flue, etc. and can be separated and collected by a collection system (separation and collection apparatus) such as a cyclone or a bag filter to recover the carbon black of interest.

Examples of the carbon black obtained by the production method of the present invention can include the same as those mentioned in detail in the description about the carbon black of the present invention.

In the carbon black obtained by the production method of the present invention, the surface free energy $\gamma^d$ and the strongly acidic group concentration can be controlled by adjusting the amount of the surfactant introduced to the surfactant introduction zone.

The present invention can provide a method for conveniently producing a carbon black which can confer reinforcing properties and low exothermicity as well as excellent abrasion resistance, when mixed with a rubber component, and is suitable for tire tread rubber that is used particularly under severe driving conditions.

Next, the rubber composition according to the present invention will be described.

The rubber composition according to the present invention comprises 20 to 150 parts by mass of the carbon black according to the present invention with respect to 100 parts by mass of a rubber component.

In the rubber composition according to the present invention, examples of the rubber component can include at least one rubber component selected from diene rubbers such as natural rubber, styrene-butadiene rubber, polybutadiene rubber, isoprene rubber, butyl rubber, chloroprene rubber, and acrylonitrile-butadiene copolymer rubber.

The rubber composition according to the present invention comprises the carbon black according to the present invention. The details of the carbon black contained in the rubber composition are as mentioned above.

The carbon black according to the present invention has the predetermined surface free energy $\gamma^d$ and strongly acidic group concentration. Therefore, the carbon black according to the present invention can impart reinforcing properties and low exothermicity to the rubber composition and can also impart excellent abrasion resistance thereto.

In the rubber composition according to the present invention, the content ratio of the carbon black according to the present invention is 20 to 150 parts by mass with respect to 100 parts by mass of the rubber component, preferably 25 to 145 parts by mass with respect to 100 parts by mass of the rubber component, more preferably 30 to 140 parts by mass with respect to 100 parts by mass of the rubber component.

When the content ratio of the carbon black according to the present invention falls within the range described above, the rubber composition according to the present invention can exert excellent reinforcing properties, low exothermicity and abrasion resistance.

The rubber composition according to the present invention comprises preferably 60 to 100% by mass, more preferably 60 to 99% by mass, still more preferably 70 to 98% by mass, further preferably 75 to 97% by mass, in total of the rubber component and the carbon black according to the present invention.

The rubber composition according to the present invention may also contain necessary components, such as an inorganic reinforcing material, a silane coupling agent, a vulcanizing agent, a vulcanization accelerator, an antioxidant, a vulcanization aid, a softening agent, and a plasticizer, routinely used.

The rubber composition according to the present invention contains preferably 1 to 40% by mass, more preferably 2 to 30% by mass, further preferably 3 to 25% by mass, in total of these components.

The rubber composition according to the present invention can be obtained by kneading the desired amount of the carbon black with the desired amount of optional components such as an inorganic reinforcing material, a silane coupling agent, a vulcanizing agent, a vulcanization accelerator, an antioxidant, a vulcanization aid, a softening agent, and a plasticizer, and the rubber component. The kneading can be performed using a kneader such as a mixer or a mill known in the art.

The rubber composition according to the present invention can be molded into a predetermined shape and then appropriately cured by warming to 130 to 180° C. to obtain the desired rubber molding.

The rubber composition according to the present invention can improve the exothermic characteristics of the resulting rubber and has well-balanced and improved reinforcing properties and exothermicity. Therefore, the rubber composition according to the present invention can be suitably used as a rubber composition for tire treads.

Next, the present invention will be described further specifically with reference to Examples. However, these examples are given merely for illustrative purposes and are not intended to limit the present invention.

EXAMPLE 1

A carbon black was prepared using a reactor having a substantially cylindrical shape as shown in FIG. 1.

The reactor shown in FIG. 1 is provided with fuel combustion zone 3, raw material introduction zone 5, surfactant introduction zone 8, reaction zone 9 and a reaction termination zone in the presented order which communicate with each other from the upstream toward downstream directions of a gas channel formed in the reactor.

In the reactor shown in FIG. 1, the fuel combustion zone 3 (inside diameter: 500 mm, length: 1200 mm) has oxygen-containing gas inlet 1 which introduces an oxygen-containing gas such as air from a direction perpendicular to the axial direction of the reactor, and burner 2 for combustion which supplies a fuel in the axial direction of the reactor. The raw material introduction zone 5 (inside diameter: 200 mm, length: 700 mm) has a single-fluid nozzle serving as raw material oil introduction nozzle 4 which supplies a raw material hydrocarbon from a direction perpendicular to the axial direction of the reactor, and is disposed to coaxially communicate with the fuel combustion zone 3. The surfactant introduction zone 8 has a single-fluid nozzle serving as surfactant introduction nozzle 6 which supplies a surfactant from a direction perpendicular to the axial direction of the reactor, and is disposed to coaxially communicate with the raw material introduction zone 5. The reaction zone 9 is disposed to coaxially communicate with the surfactant introduction zone 8 (surfactant introduction zone and reaction zone inside diameter: 700 mm, length: 10,000 mm). The reaction termination zone has coolant introduction nozzle 7 (water cooling quencher) which supplies coolant water from a direction perpendicular to the axial direction of the reactor and is positionally changeable in the upward and downward directions of the drawing, and is disposed to coaxially communicate with the reaction zone 9.

As shown in FIG. 1, the reactor assumes a Tsuzumi (Japanese hand drum)-like diaphragm shape that gradually reduces its diameter from the fuel combustion zone 3 toward the raw material introduction zone 5 and also expands its diameter in a tapered manner from the raw material introduction zone 5 toward the surfactant introduction zone 8, before and after the raw material introduction zone 5.

In the fuel combustion zone 3, 4000 Nm³/h of air preheated to 500° C. was supplied from the oxygen-containing gas inlet 1 while 150 kg/h of FCC residue oil (petroleum-derived residue oil) was jet-supplied as a fuel oil from the burner 2 for combustion for co-combustion to form a high-temperature combustion gas flow circulating in the axial direction of the reactor.

The high-temperature combustion gas flow was introduced to the raw material supply zone 5 while 850 kg/h of creosote oil was supplied as a raw material oil thereto from the single-fluid nozzle serving as the raw material oil introduction nozzle 4. Subsequently, 35 L/h of a nonionic ether-type surfactant was supplied as a surfactant to the surfactant introduction zone from the surfactant introduction nozzle 6. Thus, the sequential reaction was allowed to proceed to thereby produce a carbon black-containing gas.

Subsequently, the carbon black-containing gas produced in the raw material introduction zone 5 and the surfactant introduction zone 8 was introduced to the reaction zone 9, further sufficiently reacted, and then introduced to the reaction termination zone where coolant water was sprayed thereto from the coolant introduction nozzle 7. The cooled carbon black particles passed through a flue, etc. and was collected by a separation and collection apparatus (not shown) to recover the carbon black of interest.

Results of measuring the surface free energy $\gamma^d$ (mJ/m$^2$), strongly acidic group concentration (μmol/m$^2$), nitrogen adsorption specific surface area (m$^2$/g), 24M4DBP absorption (cm$^3$/100 g) of the carbon black thus obtained are shown in Table 1, together with production conditions.

Examples 2 to 8 and Comparative Examples 1 to 3

Each carbon black was produced in the same way as in Example 1 except that the amount of the air supplied, the amount of the fuel oil supplied, the amount of the raw material supplied and the amount of the surfactant supplied were changed as shown in Tables 1 and 2.

Results of measuring the surface free energy $\gamma^d$ (mJ/m$^2$), strongly acidic group concentration (μmol/m$^2$), nitrogen adsorption specific surface area (m$^2$/g), 24M4DBP absorption (cm$^3$/100 g) of each carbon black thus obtained are shown in Tables 1 and 2, together with production conditions.

TABLE 1

|  | Example 1 | Example 2 | Example 3 | Example 4 | Example 5 | Example 6 | Example 7 | Example 8 |
|---|---|---|---|---|---|---|---|---|
| Amount of air supplied (Nm$^3$/h) | 4000 | 4000 | 4000 | 4000 | 4000 | 4000 | 4000 | 4000 |
| Amount of fuel oil supplied (kg/h) | 150 | 180 | 200 | 140 | 180 | 170 | 200 | 190 |
| Amount of raw material oil supplied (kg/h) | 850 | 750 | 800 | 830 | 800 | 900 | 840 | 850 |
| Amount of surfactant added (L/h) | 35 | 250 | 300 | 35 | 100 | 50 | 200 | 100 |
| Nitrogen adsorption specific suface area (m$^2$/g) | 164 | 182 | 159 | 152 | 152 | 147 | 149 | 151 |
| 24M4DBP (cm$^3$/100 g) | 111 | 103 | 95 | 112 | 101 | 104 | 94 | 96 |
| Surface free energy $\gamma^d$ (mJ/m$^2$) | 157 | 188 | 199 | 116 | 96.5 | 77.3 | 81.8 | 125 |
| Strongly acidic group concentration (μmol/m$^2$) | 0.1 | 0.06 | 0 | 0.11 | 0.11 | 0.09 | 0.02 | 0.02 |

TABLE 2

|  | Comparative Example 1 | Comparative Example 2 | Comparative Example 3 |
|---|---|---|---|
| Amount of air supplied (Nm$^3$/h) | 4000 | 4000 | 4000 |
| Amount of fuel oil supplied (kg/h) | 180 | 180 | 180 |
| Amount of raw material oil supplied (kg/h) | 800 | 1100 | 920 |
| Amount of surfactant added (L/h) | 20 | 330 | 0 |
| Nitrogen adsorption specific surface area (m$^2$/g) | 147 | 79 | 113 |
| 24M4DBP (cm$^3$/100 g) | 102 | 86 | 96 |
| Surface free energy $\gamma^d$ (mJ/m$^2$) | 96.2 | 146 | 212 |
| Strongly acidic group concentration (μmol/m$^2$) | 0.12 | 0.12 | 0.09 |

As is evident from Tables 1 and 2, a carbon black having the desired surface free energy $\gamma^d$ and strongly acidic group concentration can be produced by controlling the amount of the surfactant added.

(Production Example of Rubber Composition)

As shown in Table 3, 100 parts by mass of natural rubber (RSS #1) as a rubber component, 45 parts by mass of any carbon black obtained in Examples and Comparative Examples described above, 3 parts by mass of stearic acid, 1 part by mass of an antioxidant (ANTAGE 6C manufactured by Kawaguchi Chemical Industry Co., Ltd.), and 4 parts by mass of zinc flower were kneaded using a hermetic type mixer (MIXTRON BB-2 manufactured by Kobe Steel, Ltd.). Then, the obtained kneaded product was kneaded with 0.5 parts by mass of a vulcanization accelerator (ACCEL NS manufactured by Kawaguchi Chemical Industry Co., Ltd.) and 1.5 parts by mass of sulfur using an open roll to obtain each rubber composition having the composition shown in Table 3.

TABLE 3

| Component contained | Content (parts by mass) |
|---|---|
| Natural rubber (RSS#1) | 100 |
| Carbon black | 45 |
| Stearic acid | 3 |
| Antioxidant | 1 |
| Zinc flower | 4 |
| Vulcanization accelerator | 0.5 |
| Sulfur | 1.5 |

Subsequently, each rubber composition thus obtained was vulcanized under a temperature condition of 145° C. for 45 minutes to form a vulcanized rubber.

An abrasion loss, dynamic storage modulus E', and a loss coefficient (tan δ) were measured by methods given below using each vulcanized rubber thus obtained. The results are shown in Table 4.

In Table 4, the results about the abrasion loss (g/5 min), the dynamic storage modulus E', and the loss coefficient (tan δ) are shown on the basis of each Example or Comparative Example in which each carbon black used was obtained.

<Abrasion loss>

The abrasion loss (g/5 min) was measured in conformity to the method defined in JIS K6264 "Rubber, vulcanized or thermoplastic—Abrasion testing—Guidance —" under the conditions given below using a Lambourn abrasion tester (machinery slip mechanism). A smaller abrasion loss means better abrasion resistance.

Test specimen: thickness: 5 mm, outside diameter: 48 mm
Emery wheel: GC type (green silicon carbide), particle size #80, hardness H
Added silicon carbide powder: particle size: F80, added amount: 9 g/min
Slip ratio: 18%
The number of revolutions of test specimen: 480 ppm
Test load: 3 kg <Dynamic Storage Modulus E' and Loss Coefficient (Tan δ)>

A test specimen of 2 mm thick, 35 mm long, and 5 mm wide cut out of each vulcanized rubber obtained was used. The dynamic storage modulus E' (MPa) and the loss coefficient (tan δ) were measured in conformity to the method defined in JIS K6394 "Rubber, vulcanized or thermoplastic—Determination of dynamic properties—General Guidance—" under measurement conditions involving a frequency of 50 Hz, a dynamic distortion factor of 1.26%, and a measurement temperature of 60° C. using a viscoelastic spectrometer (VR-7110 manufactured by Ueshima Seisakusho Co., Ltd.).

A larger value of the dynamic storage modulus E' means higher reinforcing properties. A smaller value of the loss coefficient (tan δ) means lower exothermicity.

TABLE 4

|  | Abrasion loss (g/5 min) | Dynamic storage modulus E' (MPa) | Loss coefficient (tanδ) |
|---|---|---|---|
| Example 1 | 0.112 | 11.30 | 0.173 |
| Example 2 | 0.103 | 11.30 | 0.182 |
| Example 3 | 0.080 | 11.60 | 0.200 |
| Example 4 | 0.096 | 10.78 | 0.189 |
| Example 5 | 0.130 | 9.65 | 0.168 |
| Example 6 | 0.115 | 9.11 | 0.172 |
| Example 7 | 0.086 | 12.00 | 0.200 |
| Example 8 | 0.086 | 11.40 | 0.196 |
| Comparative Example 1 | 0.112 | 8.60 | 0.203 |
| Comparative Example 2 | 0.175 | 6.74 | 0.172 |
| Comparative Example 3 | 0.156 | 7.52 | 0.180 |

As is evident from Tables 1 and 4, the rubber compositions containing the carbon blacks of the present invention obtained in Examples 1 to 8 have a small abrasion loss and excellent abrasion resistance and also have excellent reinforcing properties due to a large value of the dynamic storage modulus E' and low exothermicity due to a small value of the loss coefficient (tan δ), because the carbon blacks contained therein have surface free energy $\gamma^d$ of 50 to 200 mJ/m2 determined by a reverse-phase gas chromatography analysis method and a strongly acidic group concentration of 0 to 0.115 µmol/m².

FIG. 2 is a diagram in which the data on the abrasion loss was plotted against each loss coefficient (tan δ) shown in Table 4. Plotted data points positioned more ahead in the direction indicated by the arrow shown in FIG. 2 mean better abrasion resistance and exothermic characteristics. As is also evident from this drawing, the rubber compositions containing the carbon blacks of the present invention obtained in Examples 1 to 8 are excellent in abrasion resistance and exothermic characteristics.

FIG. 3 is a diagram in which the data on the dynamic storage modulus E' was plotted against each loss coefficient (tan δ) shown in Table 4. Plotted data points positioned more ahead in the direction indicated by the arrow shown in FIG. 3 mean better reinforcing properties and exothermic characteristics. As is also evident from this drawing, the rubber compositions containing the carbon blacks of the present invention obtained in Examples 1 to 8 are excellent in reinforcing properties and exothermic characteristics.

On the other hand, as is evident from Tables 2 and 4, the rubber compositions containing the carbon blacks obtained in Comparative Examples 1 to 3 have a large abrasion loss and poor abrasion resistance (Comparative Examples 2 and 3) or have poor reinforcing properties due to small dynamic storage modulus E' (Comparative Example 1), because the carbon blacks contained therein have surface free energy $\gamma^d$ that falls outside the range of 50 to 200 mJ/m² (Comparative Example 3) or a strongly acidic group concentration that falls outside the range of 0 to 0.115 µmol/m² (Comparative Examples 1 and 2).

Industrial Applicability

The present invention can provide a carbon black which can confer reinforcing properties and low exothermicity as well as excellent abrasion resistance, when mixed with a rubber component, and is suitable for tire tread rubber that is used particularly under severe driving conditions. The present invention can also provide a method for conveniently producing the carbon black, and a rubber composition.

REFERENCE SIGNS LIST

1: oxygen-containing gas inlet
2: Burner for combustion
3: Fuel combustion zone
4: Raw material oil introduction nozzle
5: Raw material introduction zone
6: Surfactant introduction nozzle
7: Coolant introduction nozzle
8: Surfactant introduction zone
9: Reaction zone

The invention claimed is:

1. A carbon black having surface free energy $\gamma^d$ of 50 to 200 mJ/m² determined by a reverse-phase gas chromatography analysis method and a strongly acidic group concentration of 0 to 0.115 µmol/m².

2. The carbon black according to claim 1, wherein the carbon black has a nitrogen adsorption specific surface area of 80 to 200 m²/g and a 24M4DBP absorption of 50 to 130 cm³/100 g.

3. A method for producing a carbon black according to claim 1, in which a reactor provided with a fuel combustion zone, a raw material introduction zone and a surfactant introduction zone in the presented order from the upstream toward downstream direction; a gas channel is used,
the method comprising introducing an oxygen-containing gas and a fuel to the fuel combustion zone for co-combustion to generate a high-temperature combustion gas flow;
introducing the high-temperature combustion gas flow to the raw material introduction zone while introducing a raw material hydrocarbon thereto, and subsequently introducing a surfactant to the surfactant introduction zone, to thereby allow reaction to proceed to produce a carbon black-containing gas.

4. A rubber composition comprising 20 to 150 parts by mass of a carbon black according to claim 1 with respect to 100 parts by mass of a rubber component.

5. A rubber composition comprising 20 to 150 parts by mass of a carbon black according to claim 2 with respect to 100 parts by mass of a rubber component.

* * * * *